United States Patent [19]
Horvath et al.

[11] 3,729,028
[45] Apr. 24, 1973

[54] FLEXIBLE HIGH-STRENGTH WIRE-REINFORCED RUBBER HOSES

[75] Inventors: Laszlo Horvath; Gusztav Gundisch; Mihaly Arvai; Sandor Antal, all of Budapest, Hungary

[73] Assignee: Orszagos Gumiipari Vallalat, Budapest VIII, Hungary

[22] Filed: June 10, 1971

[21] Appl. No.: 151,739

[52] U.S. Cl. ............... 138/130, 138/131, 138/133, 138/134, 138/137
[51] Int. Cl. ............................................. F16l 11/00
[58] Field of Search ............... 138/129, 130, 131, 138/132, 133, 134, 137

[56] References Cited

UNITED STATES PATENTS

| | | | |
|---|---|---|---|
| 475,384 | 5/1892 | Cockburn | 138/130 X |
| 2,747,616 | 5/1956 | DeGanahl | 138/132 X |
| 3,212,528 | 10/1965 | Haas | 138/130 |
| 3,566,924 | 3/1971 | Ambrus et al. | 138/130 |

Primary Examiner—Meyer Perlin
Assistant Examiner—Ronald C. Capossela
Attorney—Young & Thompson

[57] ABSTRACT

In a flexible high-strength fiber-reinforced rubber hose having a plurality of reinforcing wire plies, a well defined relation is established between the wrapping angles of the plies the essence of which is that the angle difference between the plies of higher pitches is smaller than the angle difference between the angles of plies of smaller pitches, while the angles satisfy well defined relations.

5 Claims, 3 Drawing Figures

Patented April 24, 1973  3,729,028

FLEXIBLE HIGH-STRENGTH WIRE-REINFORCED RUBBER HOSES

BACKGROUND OF THE INVENTION

This invention relates to flexible high-strength fiber-reinforced rubber hoses.

As is known, such rubber hoses have to cope with ever increasing requirements which prescribe, at present, internal diameters of 100 millimeters and more, and a suitability for internal pressures of up to 700 absolute atmospheres. Moreover, for special purposes rubber hoses are needed which have to withstand an additional external pressure of 300 absolute atmospheres and an axially acting force of 300 tons, and are suitable for being loaded by a torque of up to 2,000 meter-kiloponds.

Since conventional rubber hoses are unsuitable for bearing such loads, it has been suggested to form rubber hoses of a plurality of circularly woven superposed plies. However, the life period or durability of such rubber hoses is insufficient. This is due to their braided fibers being mutually rubbed under the action of internal pressure which, generally, appears in the form of surges.

Another known suggestion consists in employing plies the fibers of which show alternately opposite hands. However, with such rubber hoses it is very difficult to ensure co-operation of plies of different diameters. In addition, they show a relatively high torsion under loads.

It has been suggested to improve the co-operation of the plies of such rubber hoses by deviating from the conventional pitch angle of 35°16' to the hose axis which has been held ideal. For this purpose either pairwise similar angles have conventionally been selected or but slight angle differences have been employed between associated plies. Such expedients, however, failed to ensure good co-operation of the plies in a satisfactory manner. Moreover, the arising forces considerably differ from one another and measuring data show variations from 50 to 300 percent.

BRIEF SUMMARY OF THE INVENTION

The main object of the present invention is to obviate such deficiencies and to provide flexible high-strength wire-reinforced rubber hoses the plies of which show a desired co-operation under service conditions. In order to ascertain the sources of the aforesaid deficiencies various investigations have been made:

A rubber hose comprising a pair of plies wrapped at an angle of the conventional value of 35°16' has been exposed to pressure. Thereupon, the rubber hose showed a considerable torsional deflection at an insignificant change of length. The torsional deflection already appeared at relatively low pressures in the range of 25 to 50 atmospheres whereafter its changes with increasing pressure were negligible. The direction of torsion was always such that the upper ply became constricted. Such behavior of the rubber hose may perhaps be explained by the technology of manufacture of rubber hoses which implies that co-operation between the plies may be obtained only after a certain constriction because during the manufacturing procedure there is always some residual looseness in the structure of the rubber hose due to mutual recession of its plies. Constriction results because the diameter of the internal ply increases upon torsional deflection while the diameter of the external ply decreases. Constriction amounts to about 0.1 to 0.8 millimeter in case of thoroughly constructed rubber hoses having diameters in the range of 76 to 101 millimeters.

Thus, with double ply rubber hoses co-operation of the plies is obtained by torsional deflection although the loads therein will not be uniform and experiments have shown that the difference between the loads amounts to about 50 percent so that it must not be neglected.

With high pressure rubber hoses having a plurality of plies the difficulties are still greater since constriction between the various plies is not always obtained by torsional deflection. For instance, in case of a four-ply rubber hose in which the plies were alternately wrapped at opposite hands and at uniform angles, or were wrapped pairwise at the same angle, the lowermost ply would show outward torsional deflection while the second ply would be deflected inwardly upon internal pressure. Thus, the interstice between the first and second ply would decrease. However, the first ply caused — through the fitting or coupling of the rubber hose — the third ply of similar hand to flare whereby the diameter of the latter increased. Since the diameter of the second ply decreased, no constriction necessary for co-operation could be obtained between the second and third ply.

In summary, differences between the loads in the plies and distortions under such loads are due to three circumstances. First, a constriction of the plies under load cannot entirely be eliminated even if the best known method is employed for manufacture. Secondly, torsional deflection does not produce uniform loads in the plies. Moreover, it is responsible for shearing forces by which the useful life of the hoses is materially limited. Third, the reinforcing wire plies of heavy-duty rubber hoses may be manufactured but of materials of extraordinarily low elongation which means that materials with practically no elongation at all will be employed. Consequently, there will be no elongations of such materials which would permit a compensation of load differences between the plies of a rubber hose.

Thus, the only expedient to bring about constriction between the plies of a rubber hose and uniformity of ply loads is the variation of the hose length. For such purpose, however, the plies have to be wrapped at various angles the variation of which is such that upon change of the length plies of higher pitches will vary in diameter more than those of smaller pitches. A further consideration consists in that with the lowermost ply or with the lower plies of a rubber hose being wrapped at an angle greater than the conventional value of 35°16' the rubber hose will become shorter upon internal pressure whereas the plies being wrapped at angles smaller than the aforesaid value the length of the rubber hose will increase.

It has now been ascertained that a desired uniform constriction and load distribution between the plies due to length variations may be obtained if the pitches of the plies of rubber hoses of the shortening type decrease and the pitches of the plies of rubber hoses of the lengthening type increase radially outward in such a manner that the angle difference between the plies of higher pitches is smaller than the difference between the angles of the plies of smaller pitches and this is the essence of the invention. It can be shown that for three superposed plies such requirement means a relation in which:

$$(D'_{j-1} - D_{j-1}) - (D'_j - D_j) = (D'_j - D_j) - (D'_{j+1} - D_{j+1}) \quad (1)$$

where $D_{j-1}, D_j, D_{j+1}$ designate original diameters, $D'_{j-1}, D'_j, D'_{j+7}$ designate changed diameters, and $j$ designates the serial number of a ply in a radially outward direction.

Relation (1) which has to be fulfilled by further plies as well means in case of rubber hoses of more than three wire-reinforced plies that the difference between the diameter changes of the first two plies should be equal to the difference between the diameter changes of the second two plies. Calculations based on relation (1) result in the following relation between the wrapping angles of three superposed plies:

$$D_{j-1}\tan^2\alpha_{j-1} + D_{j+1}\tan^2\alpha_{j+1} = 2D_j\tan^2\alpha_j \quad (2)$$

where $\alpha$ is the angle of the ply wires to the hose axis.

The wrapping angles of further plies are calculated in a similar manner.

Relation (2) establishes a strict interdependence between the wrapping angles of superposed plies in a group of such plies. However, it has been found that further requirements have to be met if uniform constrictions and load distribution between the plies are desired. First, both extreme angles, i.e., the wrapping angles of the innermost ply and the outermost ply have to be selected according to the least difference between the strains in the individual plies, the strains themselves being ascertained by measurements. Secondly, it has to be considered as well that rubber hoses having plies of great wrapping angles approaching 90° are less flexible which means relatively higher stresses upon being incurved. Thirdly, the greater the difference between the wrapping angles, the lesser the length variation required for the constriction of the plies.

Such considerations show that in case of rubber hoses with at least three superposed plies the difference between both extreme angles shall lie in the range of 6° to 80° while the intermediate angles are to be selected so that they satisfy relation (2). Then the difference between the diameter changes will be responsible for a constriction of 0.1 to 0.8 millimeter. Thus, in its broadest terms, the invention is concerned with flexible high-strength wire-reinforced rubber hoses comprising a plurality of load-bearing wire plies incorporated therein, each wire ply being formed of a multiplicity of individual resiliently flexible wires disposed in helical convolutions about the longitudinal axis of the hose in a manner known per se. The invention proper consists in that the innermost wire ply and the outermost wire ply are wrapped at angles to the hose axis the difference of which lies within the range of 6° to 80° while the wrapping angles of three contiguous plies satisfy the aforesaid relation (2).

BRIEF DESCRIPTION OF THE DRAWINGS

The invention will now be described in greater detail by reference to the accompanying drawings the FIGS. 1 to 3 of which show perspective views of exemplified hose constructions according to the invention, the component portions of the hose covers being broken away progressively to illustrate the nature of the several components.

Same reference characters designate similar details throughout the drawings.

DETAILED DESCRIPTION OF THE PREFERRED EMBODIMENTS

Figure 1:
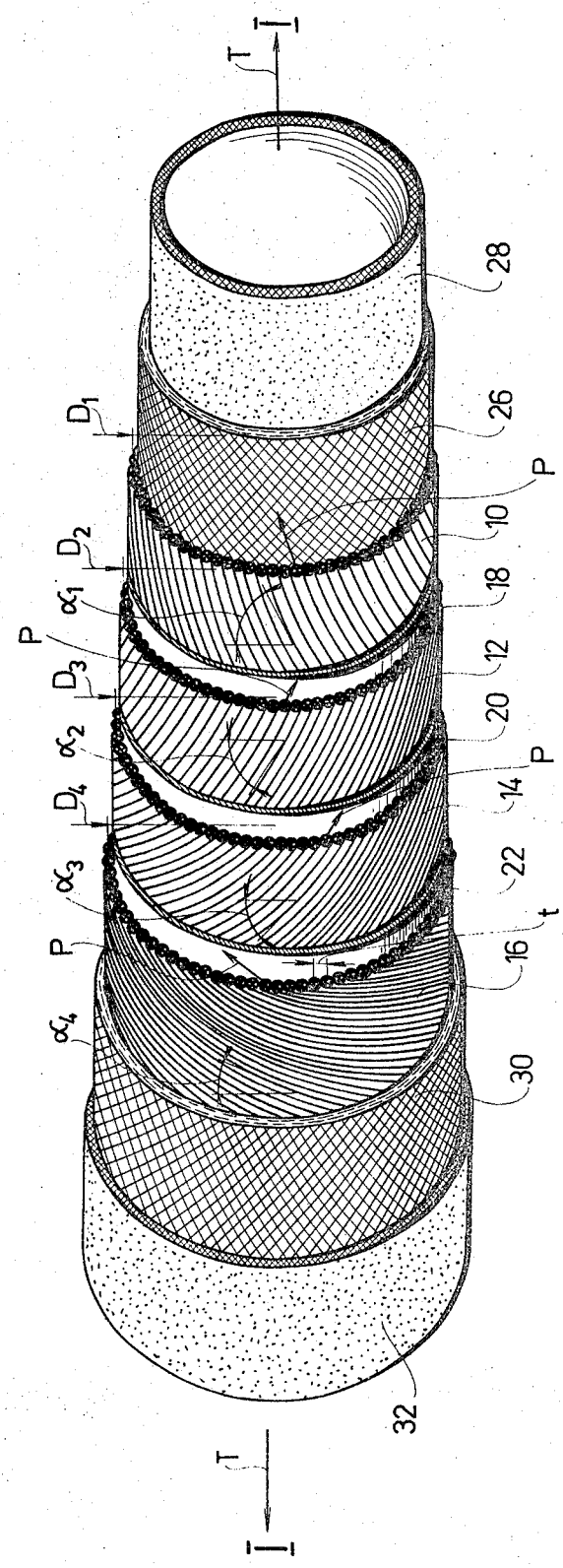

Referring to the drawings, FIG. 1 shows a rubber hose having four superposed wire plies 10, 12, 14, 16, each wire ply being composed of a multiplicity of individual fine high tensile wires disposed in parallel helical convolutions about the longitudinal axis I — I of the hose. The helices are of opposite hands in extreme pairs of wire plies 10, 12 and 14, 16, respectively. The several wire plies 10, 12, 14, 16 are insulated from one another in a manner known per se by means of layers of, e.g., rubberized cloth 18, 20 and 22, respectively. A pressure distributor layer 26 made of non-metallic fabric underlies the innermost wire ply 10 and, in turn, encloses a rubber tube 28. On the other hand, wire ply 16 is surrounded by a layer 30 made likewise of non-metallic fabric which, in turn, underlies an outer rubber cover 32.

In compliance with the present invention, relations (2) requires that $$D_1\tan^2\alpha_1 + D_3\tan^2\alpha_3 = 2D_2\tan^2\alpha_2$$

and $$D_2\tan^2\alpha_2 + D_4\tan^2\alpha_4 = 2D_3\tan^2\alpha_3$$

where $$6° \leq \alpha_2 - \alpha_4 \leq 60°$$

and $$\alpha_1 > \alpha_2 > \alpha_3 > \alpha_4$$

If it is desired that the rubber hose have equal burst resistance and tensile strength which means equal radial and axial load carrying capacities, the wrapping angles have to satisfy a further relation which requires that $$sin^2\alpha_1 + sin^2\alpha_2 + \ldots + sin^2\alpha_b = (n/3) \times (0 \times 21 \ t \times T/P \times D \times) \quad (3)$$

where $\alpha_1, \alpha_2, \ldots, \alpha_n$ designate wrapping angles, $n$ designates the number of reinforcing plies, $t$ designates the distance between wire centers of a pair of contiguous convolutions in a fiber-reinforced ply in centimeters, $T$ designates the sum of axial external forces loading the individual plies in kiloponds, $P$ designates the forces appearing in the wire plies in kiloponds and $D$ designates the mean diameter of the wire plies in centimeters.

In the instant case, $$n = 4$$

and $$D = D_1 + D_2 + D_3 + D_4/4$$

The directions of the fibers in the plies have to be selected in consideration of torsional deflection. E.g., in case of the exemplified four-ply rubber hose both intermediate plies 12 and 14 are unidirectional while both extreme plies 10 and 16 are of the opposite hand. If in the course of the manufacturing procedure the dimensions of such rubber hose deviate from the calculated values, a deflection of the first ply 10 tries to constrict the third ply 14 through the fitting or (not shown) of the hose. Then, a slight recession between the second (fourth) ply 12 or 16 and the third ply 14 will be experienced as if the third ply were unidirectional with the first ply 10.

Such new rubber hose structure may be called A − B − B − A type arrangement where A designates a selected direction and B designates the opposite hand. In addition to its above mentioned advantage of favorable response to torsional deflection it has the further advantage of the mean diameter of the pairs of plies of opposite hands being exactly the same. Such uniformity of both mean diameters results in circumstances similar to those of circularly woven or braided plies yet without the undesired weakening action of mutually rubbing wires.

Figure 2:
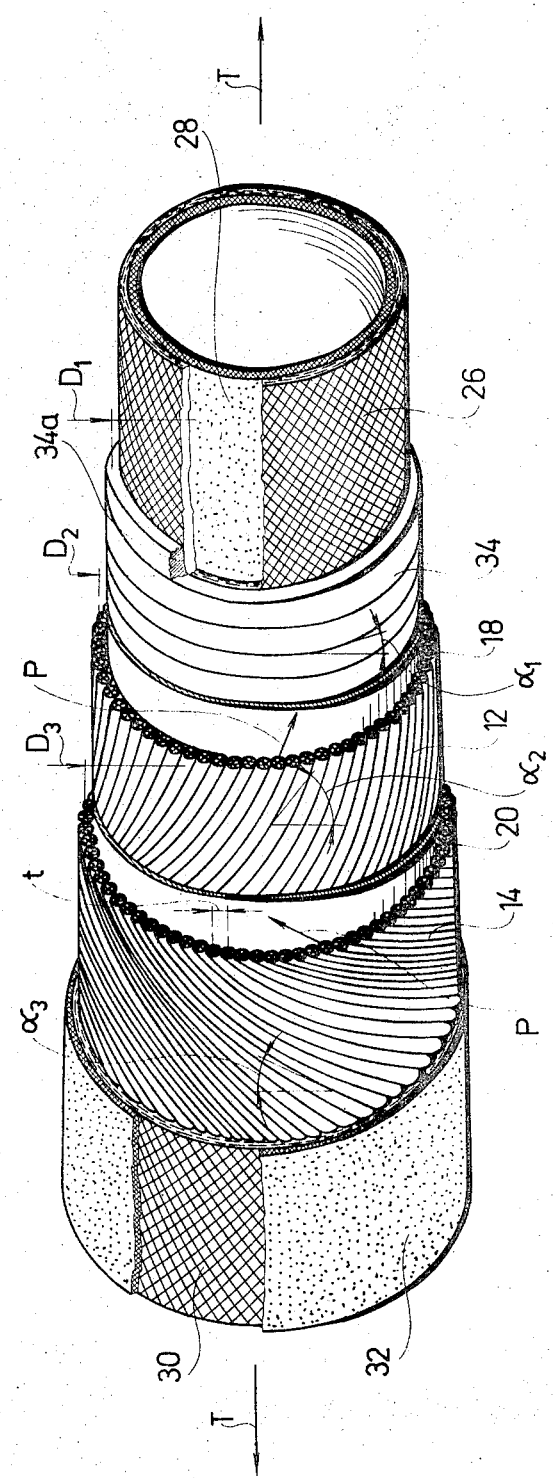

FIG. 2 illustrates, by way of example, an embodiment which differs from the previous one in two respects. First, it has three reinforcing wire plies instead of four, and, secondly, one of them is a ply 34 consisting of the convolutions of one helical wire of rectangular cross-sectional area 34a instead of a multiplicity of individual wires. Thus, wire-ply 34 which is substituted for wire ply 10 of the previous exemplified embodiment has a high moment of inertia of at least five times the moment of inertia of the other wire plies 12 and 14 at a mean diameter of $D_1$ and at a small wrapping angle $\alpha_1$ of at most 5°. If relation (3) is satisfied by the various parameters of such rubber hose, it will be suitable to withstand, in addition to internal and external pressures as in the former case, big axial surplus loads due to excessive lengths such as required in deep drilling where rubber hoses have to be serviceable at depths of 3,000 meters and more. It has been found that in such cases, the crushing action of the big axial surplus load will be borne by the innermost ply 34 of the system formed by a helix of specified construction.

Figure 3:
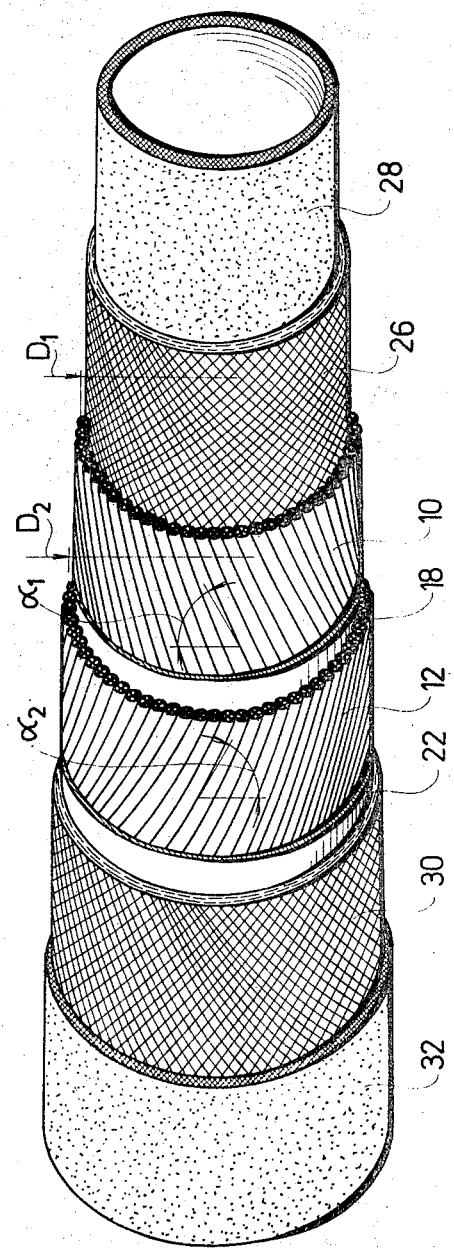

FIG. 3 represents an exemplified embodiment where the series of plies degenerates, as it were, to a single pair of wire plies such as plies 10 and 12 of the embodiment shown in FIG. 1. However, the basic idea of ensuring uniform loads in both plies 10 and 12 by the compensating effect of length variations is obtainable here as well if the difference of the wrapping angles $\alpha_1$ and $\alpha_2$ of the plies 10 and 12, respectively, is selected so as to lie in a range of 2° to 8° while the mean value of the wrapping angles differs by at least 10 minutes from the conventional value of 35°16′. This means that:

$$35°16′ + 10′ \leq \alpha_1 + \alpha_2/2 = 35°16′ − 10′,$$

$$2° \leq \alpha_1 − \alpha_2 \leq 8°$$

and $$\alpha_1 > \alpha_2$$

In general terms, double-ply rubber hoses made in compliance with the present invention will have a wrapping angle difference which lies in the range of 2° to 8°. Dependent on whether rubber hoses of the shortening or lengthening type have to be produced, the mean value of both angles will be greater or smaller by 10 minutes than the conventional value of 35°16′.

The distortions in operation of big high strength rubber hoses can be further decreased. It has been found that distortions take place at relatively small pressures. Therefore, it is suggested that the rubber hoses be — in the course of their manufacture — put under internal pressure prior to their being cured whereby their plies will be constricted due to length variation prior to curing and, thus, they will be fixed in such position when cured so that distortions in service will decrease to practically negligible extents.

It has been shown that similar constrictions within the plies can be obtained with both shortening and lengthening rubber hose types. Generally, the use of the shortening type rubber hoses will be preferred since their behavior and bending properties are more favorable. However, if the stresses of the rubber hose comprise big axial loads and torques, preferably rubber hoses of the lengthening type will be used.

What we claim is:

1. A flexible high-strength fiber-reinforced rubber hose, comprising a plurality of load-bearing wire plies incorporated therein, each wire ply being formed of a multiplicity of individual resiliently flexible wires disposed in helical convolutions about the longitudinal axis of the hose, the outermost wire plies being at angles to the hose axis the difference between which amounts to 6° to 80° and the angles of three contiguous wire plies satisfying the following equation:

$$D_{j-1}\tan^2\alpha_{j-1} + D_{j+1}\tan^2\alpha_{j+1} = 2\, D_j\tan^2\alpha_j$$

where
   $D_{j-1}$, $D_j$, and $D_{j+1}$ are the diameters of the three contiguous wire plies, respectively,
   $\alpha_{j-1}$, $\alpha_j$ and $\alpha_{j+1}$ are the angles of the respective wire plies to the hose axis, and
   $j$ is the serial number of any intermediate wire ply.

2. In a flexible high-strength fiber-reinforced rubber hose as claimed in claim 1 the improvement of one of the wire plies being a helical steel spring.

3. In a flexible high-strength fiber-reinforced rubber hose as claimed in claim 1 the improvement of at least two contiguous wire plies having helical convolutions of the same hand.

4. A flexible high-strength fiber-reinforced rubber hose comprising two load-bearing wire plies incorporated therein, each wire ply being formed of a multiplicity of individual resiliently flexible wires disposed in helical convolutions about the longitudinal axis of the hose, both wire plies having angles to the hose axis the difference of which lies between 2° to 8°, the average of the angles being different by at least 10 minutes from the value of 35°16′.

5. In a flexible high-strength fiber-reinforced rubber hose as claimed in claim 1 the improvement in which the wrapping angles of all wire plies satisfy the following equation:

$$\sin^2\alpha_1 + \sin^2\alpha_2 + \ldots + \sin^2\alpha_n = (n/3) - (0.21 \cdot t \cdot T)/(P \cdot D)$$

where $\alpha_1, \alpha_2 \ldots, \alpha_n$ designate wrapping angles, $n$ designates the number of reinforcing plies, $t$ designates the distance between wire centers of a pair of contiguous convolutions in a fiber-reinforced ply in centimeters, $T$ designates the sum of axial external forces loading the individual plies in kiloponds, $P$ designates the forces appearing in the wire plies in kiloponds and $D$ designates the mean diameter of the wire plies in centimeters.

* * * * *